(12) United States Patent
Hio et al.

(10) Patent No.: US 7,270,335 B2
(45) Date of Patent: Sep. 18, 2007

(54) ELECTROMAGNETIC SUSPENSION APPARATUS FOR AUTOMOTIVE VEHICLES AND METHOD FOR CONTROLLING ELECTRIC MOTOR OF THE SAME

(75) Inventors: Koji Hio, Kanagawa (JP); Takaaki Uno, Kanagawa (JP); Masaharu Sato, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 513 days.

(21) Appl. No.: 10/768,641

(22) Filed: Feb. 2, 2004

(65) Prior Publication Data

US 2004/0154886 A1   Aug. 12, 2004

(30) Foreign Application Priority Data

Feb. 5, 2003   (JP) .............................. 2003-027858

(51) Int. Cl.
*B60G 17/015* (2006.01)
(52) U.S. Cl. ...................................................... 280/5.5
(58) Field of Classification Search ................ 280/5.5, 280/5.507, 5.512, 5.515; 701/37, 38; 318/370–376, 318/611–613; 188/299
See application file for complete search history.

(56) References Cited

U.S. PATENT DOCUMENTS 6,708,094 B2 * 3/2004 Charaudeau et al. .......... 701/37

7,005,816 B2   2/2006 Hio et al.

FOREIGN PATENT DOCUMENTS

| EP | 0 412 853 A2 | 2/1991 |
| JP | 7-149130 A | 6/1995 |
| JP | 10-210788 A | 8/1998 |
| JP | 10-341584 A | 12/1998 |
| WO | WO 02/066271 A1 | 8/2002 |
| WO | WO 02/087909 A1 | 11/2002 |

\* cited by examiner

*Primary Examiner*—Faye M. Fleming
(74) *Attorney, Agent, or Firm*—Foley & Lardner LLP

(57) ABSTRACT

An electromagnetic suspension apparatus for an automotive vehicle, employs an electromagnetic actuator interleaved between a sprung mass and an unsprung mass and arranged in parallel with a suspension spring element, and an electric motor built in the electromagnetic actuator for driving the electromagnetic actuator. A motor controller calculates a displacement input, such as a suspension stroke acceleration and a suspension velocity, transmitted to the electromagnetic actuator, and controls the motor to bring a suspension damping force closer to a desired damping force suited for the displacement input. The motor controller calculates an internal inertia force of the electromagnetic actuator, and corrects or compensates for a motor output by the internal inertia force of the electromagnetic actuator.

7 Claims, 5 Drawing Sheets

ELECTROMAGNETIC SUSPENSION APPARATUS FOR AUTOMOTIVE VEHICLES AND METHOD FOR CONTROLLING ELECTRIC MOTOR OF THE SAME

TECHNICAL FIELD

The present invention relates to an electromagnetic suspension apparatus employing an electromagnetic actuator or an electromagnetic damper capable of electromagnetically dampening or attenuating vibrations input to the automotive suspension system, and particularly to the improvement of a motor-control technology for an electric motor incorporated in the electromagnetic suspension apparatus.

BACKGROUND ART

In recent years, automotive vehicles often use an electromagnetic suspension system instead of using a hydraulic damper of a hydraulically-operated active suspension system that uses a viscous resistance of oil. One such electromagnetic suspension system has been disclosed in Japanese Patent Provisional Publication No. 7-149130 (hereinafter is referred to as "JP7-149130"). In the electric motor type suspension system disclosed in JP7-149130, a motor of the electromagnetic suspension system acts to produce a reaction torque based on a motor rotation angle, a vibration dampening torque based on a motor angular velocity, and a vehicle-body-inertia compensating torque based on a motor angular acceleration and needed to compensate for inertia force exerting on the vehicle body due to acceleration/deceleration and turning behavior of the vehicle. Actually, within an electronic suspension control system for the electromagnetic suspension system of JP7-149130, of these torques produced by the electric motor, the inertia-force compensating torque is arithmetically calculated or estimated based on a motor angular acceleration, corresponding to vertical inertia force exerted on the vehicle during driving. Such an electromagnetically-operated suspension system as disclosed in JP7-149130 can quickly variably control a suspension characteristic by controlling the magnitude of exciting current applied to the electromagnet of the electric motor. Generally, the responsiveness of the electromagnetically-operated suspension system is superior to that of the hydraulically-operated active suspension system.

SUMMARY OF THE INVENTION

In the electric-motor control method of the electromagnetically-operated suspension system of JP7-149130, an external inertia compensation for the inertia force exerted on the vehicle is taken into account. However, the motor control system of JP7-149130 does not consider an internal inertia compensation for an internal inertia force produced within the electromagnetic actuator, for example a moment of inertia of the motor rotor, and a moment of inertia of each of electromagnetic-actuator component parts displacing and rotating during the suspension stroke. Thus, the system of JP7-149130 cannot adequately satisfy one-to-one correspondence between the motor output and the electromagnetic actuator output. As a result of this, there is an increased tendency for the value of a frequency response of acceleration of a sprung mass for an input from a road surface to the suspension system to increase. This deteriorates a riding comfort. Additionally, in presence of a rapid displacement input from the road to the suspension system, the system of JP7-149130 may exhibit a low follow-up performance of an unsprung mass, thus lowering the driving stability containing both the vehicle drivability and vehicle stability. For the reasons discussed above, it would be desirable to compensate for the internal inertia force as well as the external inertia force.

Accordingly, it is an object of the invention to provide an electromagnetic suspension apparatus for an automotive vehicle and a method for controlling an electric motor incorporated in the electromagnetic suspension apparatus, capable of compensating for at least an internal inertia force, which is produced within an electromagnetic actuator of the electromagnetic suspension apparatus, thus greatly reconciling and balancing both of riding comfort and driving stability.

It is another object of the invention to provide an electromagnetic suspension apparatus for an automotive vehicle and a method for controlling an electric motor incorporated in the electromagnetic suspension apparatus, capable of compensating for an internal inertia force, which is produced within an electromagnetic actuator of the electromagnetic suspension apparatus, as well as an external inertia force, which is exerted on the vehicle, thus more greatly reconciling and balancing both of riding comfort and driving stability.

In order to accomplish the aforementioned and other objects of the present invention, an electromagnetic suspension apparatus for an automotive vehicle comprises an electromagnetic actuator interleaved between a sprung mass and an unsprung mass and arranged in parallel with a suspension spring element, an electric motor that drives the electromagnetic actuator, and a motor controller that calculates a displacement input transmitted to the electromagnetic actuator and controls the motor to bring a suspension damping force closer to a desired damping force suited for the displacement input, the motor controller comprising an actuator internal inertia force calculation section that calculates an internal inertia force of the electromagnetic actuator, and an actuator internal inertia force compensation section that compensates for the internal inertia force of the electromagnetic actuator.

According to another aspect of the invention, a method of controlling an electric motor of an electromagnetic suspension apparatus for an automotive vehicle employing a motor-driven electromagnetic actuator interleaved between a sprung mass and an unsprung mass and arranged in parallel with a suspension spring element, and a motor controller that calculates a displacement input transmitted to the electromagnetic actuator and controls the motor to bring a suspension damping force closer to a desired damping force suited for the displacement input, the method comprises controlling a driving state of the motor, while compensating for an internal inertia force of the electromagnetic actuator.

According to a further aspect of the invention, an electromagnetic suspension apparatus for an automotive vehicle, comprises an electromagnetic actuator interleaved between a sprung mass and an unsprung mass and arranged in parallel with a suspension spring element, an electric motor that drives the electromagnetic actuator, and motor controlling means for calculating a displacement input transmitted to the electromagnetic actuator and for controlling the motor to bring a suspension damping force closer to a desired damping force suited for the displacement input, the motor controlling means comprising actuator internal inertia force calculation means for calculating an internal inertia force of the electromagnetic actuator, and actuator internal inertia force compensation means for compensating for the internal inertia force of the electromagnetic actuator.

The other objects and features of this invention will become understood from the following description with reference to the accompanying drawings.

DESCRIPTION OF THE PREFERRED EMBODIMENTS

Figure 1:
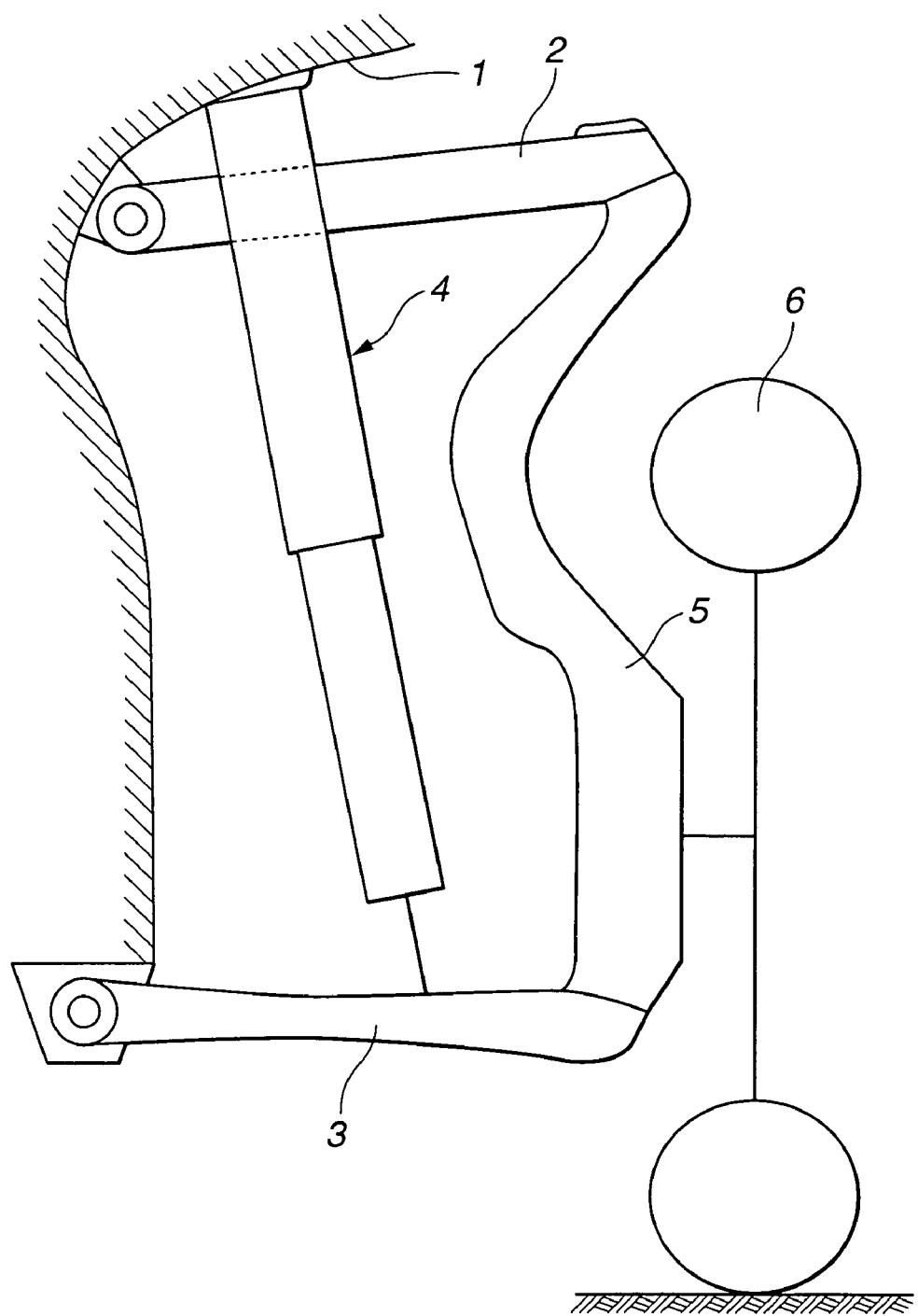
FIG. 1 is a schematic general drawing of an embodiment of an automotive electromagnetic suspension apparatus.
Figure 2:
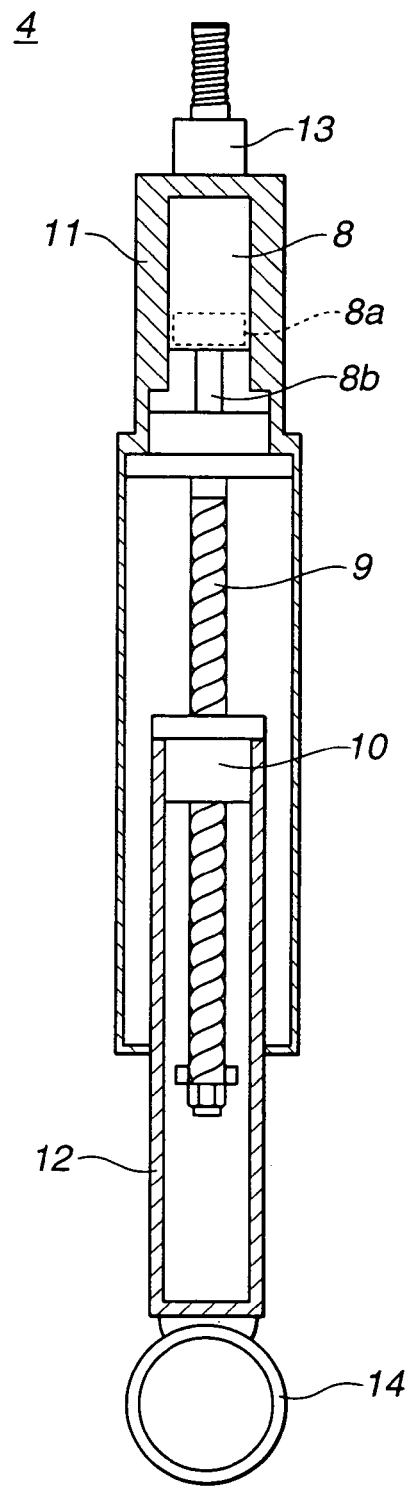
FIG. 2 is a longitudinal cross-sectional view illustrating an electromagnetic actuator of the electromagnetic suspension apparatus of the embodiment.

Referring now to the drawings, particularly to FIGS. 1 and 2, the automotive electromagnetic suspension apparatus of the embodiment is exemplified in an automotive vehicle employing multi-link independent suspensions at each road wheel.

As shown in FIG. 1, the electromagnetic suspension apparatus of the embodiment, constructing the multi-link independent suspension system, is comprised of an upper link suspension-control-arm (simply, an upper link) 2, a lower link suspension-control-arm (simply, a lower link) 3, an electromagnetic actuator 4, an axle or a spindle 5, and a tire (an unsprung mass) 6. In the electromagnetic suspension system, electromagnetic actuator 4 is used instead of using a hydraulic damper or a hydraulic shock absorber. Electromagnetic actuator 4 is interleaved between a vehicle body 1 and lower link 3 and arranged in parallel with a suspension spring element (simply, a suspension spring) 7 having a suspension spring stiffness. To change the suspension characteristic, in particular a damping property of the electromagnetic suspension system, electromagnetic actuator 4 is driven by means of an electric motor unit (simply, a motor) 8 shown in FIGS. 2 and 3.

Referring now to FIG. 2, there is shown the detailed structure of electromagnetic actuator 4, cross-sectioned in the longitudinal direction. As can be appreciated from the cross section of FIG. 2, electromagnetic actuator 4 is comprised of motor 8, a ball-screw shaft 9, a ball-screw nut 10, an outer tube 11, an inner tube 12, an upper retaining bolt 13, and an lower link support eye 14. In more detail, motor 8 is located at the upper portion of electromagnetic actuator 4 and built in outer tube 11 having upper retaining bolt 13 at the uppermost end. Motor 8 is a geared motor, which is comprised of a reduction gear 8a connected to the motor shaft portion fixedly connected to the motor rotor, and an axially-extending reduction-gear shaft 8b fixedly connected to ball-screw shaft 9. Thus, the output speed of motor 8 is reduced by a predetermined reduction ratio α. Ball-screw shaft 9 is threadably engaged with ball-screw nut 10 via recirculating balls, in such a manner as to permit rotary motion of ball-screw shaft 9 to be converted into linear motion of ball-screw nut 10 and also to permit linear motion of ball-screw nut 10 to be converted into rotary motion of ball-screw shaft 9. Inner tube 12 is fixedly connected onto the outer cylindrical periphery of ball-screw nut 10, so that inner tube hermetically covers the outer periphery of ball-screw shaft 9. Lower link support eye 14 is fixed to the lowermost end of inner tube 12 by way of welding. Upper retaining bolt 13 of electromagnetic actuator 4 is mechanically linked or connected to vehicle body 1 via an insulator (not shown), while lower link support eye 14 of electromagnetic actuator 4 is mechanically linked or connected to lower link 3 via a bushing (not shown). With the previously-discussed arrangement of electromagnetic actuator 4, the suspension characteristic containing the suspension stiffness and damping properties, that is, the electromagnetic damping characteristic can be variably controlled by adjusting the magnitude of exciting current, which is applied to motor 8.

Figure 3:
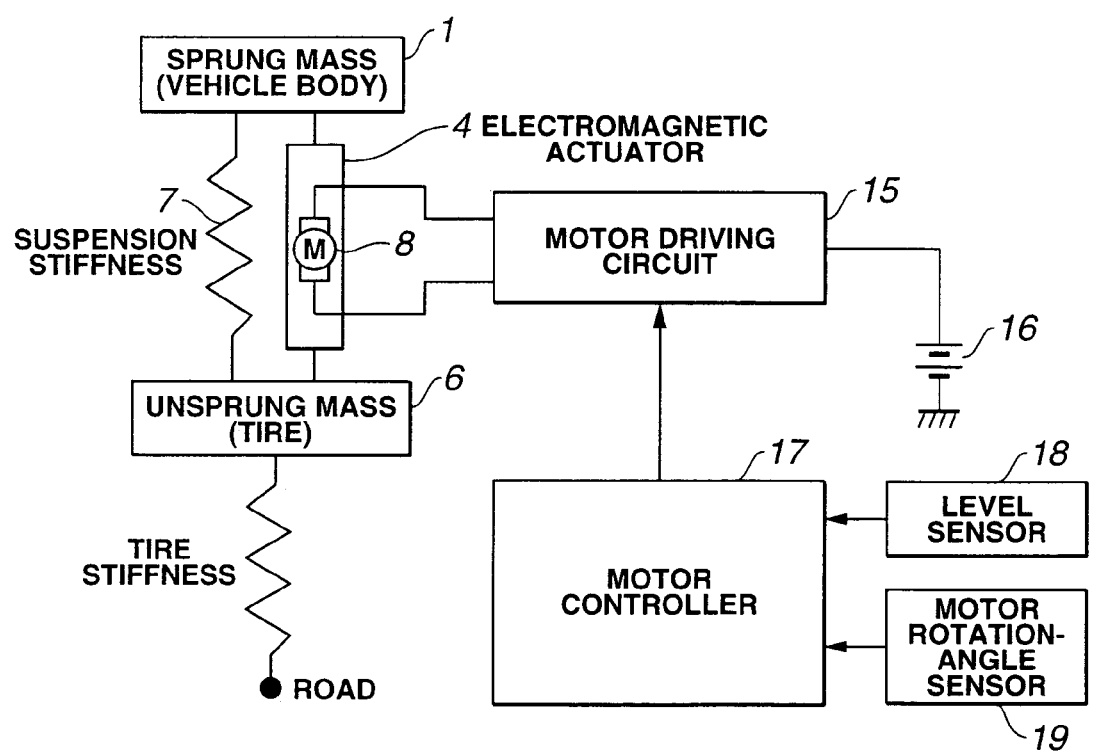
FIG. 3 shows a quarter-car model having two degrees of freedom of the electromagnetic suspension system of the embodiment, and a block diagram of a motor control system for an electric motor of the electromagnetic actuator.

Referring now to FIG. 3, there is shown the quarter-car model having two degrees of freedom (motion in a vertical direction) of the electromagnetic suspension system of the embodiment, and the block diagram of the motor control system of electromagnetic actuator 4. In the vibration system of FIG. 3 representing the electromagnetic suspension apparatus of the embodiment as the quarter-car model having two degrees of freedom, suspension spring element 7, which has a suspension stiffness, and electromagnetic actuator 4 are provided between the sprung mass (vehicle body 1) and the unsprung mass (tire 6) and arranged in parallel with each other. The tire spring, which has a tire stiffness, is interleaved between tire 6 and a road. In order to change the suspension characteristic, a motor controller 17 controls the magnitude of exciting current applied to motor 8. Motor controller 17 generally comprises a microcomputer. Motor controller 17 includes an input/output interface (I/O), memories (RAM, ROM), and a microprocessor or a central processing unit (CPU). The input/output interface (I/O) of motor controller 17 receives input information from vehicle sensors, such as a vehicle-height sensor or a level sensor 18 and a motor rotation-angle sensor 19. Within motor controller 17, the central processing unit (CPU) allows the access by the I/O interface of input informational data signals from the previously-discussed sensors 18 and 19. The CPU of motor controller 17 is responsible for carrying the motor control program stored in memories and is capable of performing necessary arithmetic operations for the motor control achieved through a motor driving circuit 15. A computational result (arithmetic calculation result), that is, a calculated output signal is relayed through the output interface circuitry of motor controller 17 via motor driving circuit 15 to an output stage, namely motor 8 of electromagnetic actuator 4 incorporated in the electromagnetic suspension apparatus of the embodiment. Concretely, motor controller 17 operates to arithmetically calculate a desired motor output in accordance with a predetermined control rule or a preprogrammed characteristic map, and then outputs a control command signal corresponding to the desired motor output to motor driving circuit 15. Motor driving circuit 15 uses a car battery as an electric power source. As hereunder described, motor controller 17 computes a required motor current value corresponding to the desired motor output, and outputs a control command signal indicative of the required motor current value to motor 8.

The motor control routine executed by motor controller 17 of the electromagnetic solenoid apparatus of the embodiment is hereinafter described in detail in reference to the flow chart of FIG. 4. The motor control routine is executed as time-triggered interrupt routines to be triggered every predetermined sampling time intervals such as 10 milliseconds.

Figure 4:
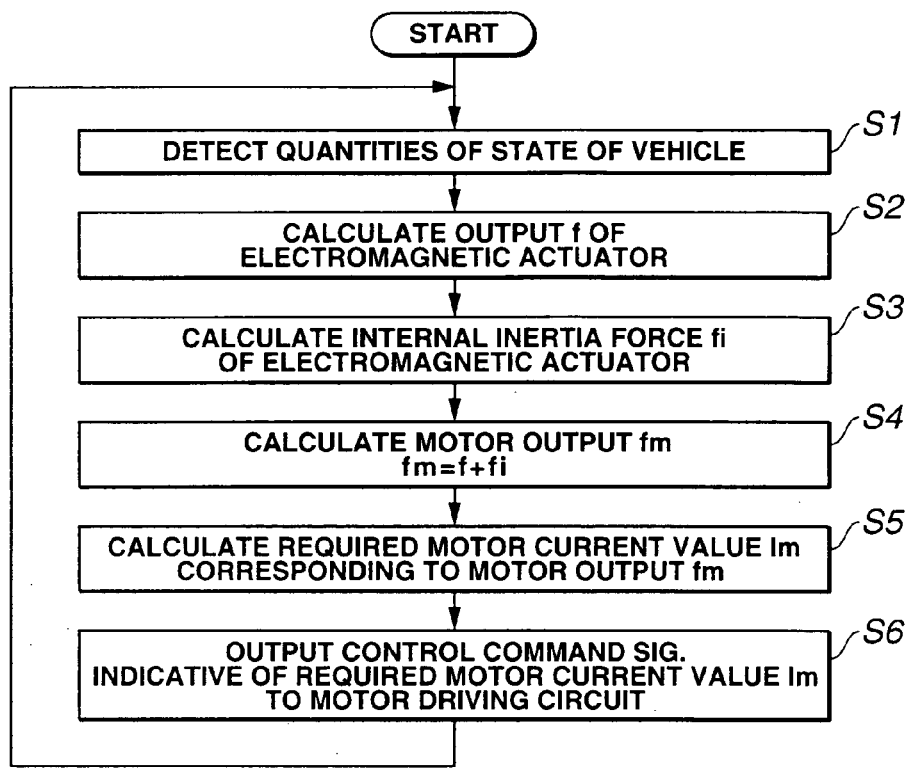
FIG. 4 is a flow chart showing a motor control routine executed within a motor controller of the electromagnetic suspension system of the embodiment.

At step S1 of the motor control routine of FIG. 4, quantities of state of the vehicle, needed to execute the motor control in accordance with the preprogrammed control rule stored in the memory of motor controller 17, are estimated or detected, and read. As the quantities of state, a suspension stroke acceleration "a" of electromagnetic actuator 4 and a motor angular velocity "ω" of motor 8 may be directly detected. In lieu thereof, these quantities of state, namely parameters "a" and "ω", can be estimated indirectly or arithmetically calculated based on other vehicle sensor values, that is, a sensor value "s" generated from level sensor 18 corresponding to a suspension stroke of electromagnetic actuator 4 and a sensor value "θ" generated from motor rotation-angle sensor 19. In the shown embodiment, in order to derive the required quantities of state "a" and "ω", the sensor values from level sensor 18 and motor rotation-angle sensor 19 are used. Actually, the suspension stroke (the sensor value "s" from level sensor 18) is differentiated to calculate a suspension stroke velocity ds/dt (="v"), and thereafter the suspension stroke velocity v=ds/dt is further differentiated to calculate a suspension stroke acceleration $d^2s/dt^2$ (="a") of electromagnetic actuator 4. In a similar manner, the motor rotation angle (the sensor value "θ" from motor rotation-angle sensor 19) is differentiated to calculate a motor angular velocity dθ/dt (="ω") of motor 8 (an angular velocity of the motor rotor).

Figure 5:
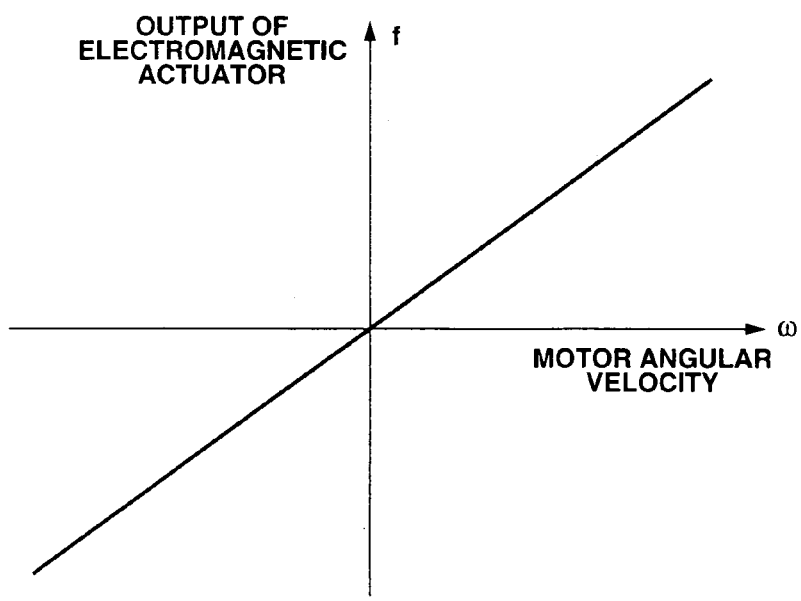
FIG. 5 is a predetermined motor angular velocity ω versus electromagnetic actuator output f characteristic map.

At step S2, an actuator output f of electromagnetic actuator 4 is estimated or calculated or retrieved based on the motor angular velocity ω from the predetermined motor angular velocity ω versus electromagnetic actuator output f characteristic map (the predetermined control rule or the predetermined damping characteristic map) shown in FIG. 5. In the shown embodiment, as seen from the ω-f characteristic map of FIG. 5, a predetermined linear damping characteristic map is used to calculate or retrieve actuator output f.

At step S3, an internal inertia force fi of electromagnetic actuator 4 is arithmetically calculated based on suspension stroke acceleration "a" of electromagnetic actuator 4 in accordance with the principle of dynamics (see the following expressions (1), (2) and (3)). The equations of motion (1)-(3) are represented on the assumption that a displacement input, that is, a suspension stroke velocity "v" and a suspension stroke acceleration "a", is applied from a road to electromagnetic actuator 4. In the expressions (1)-(3), J denotes a summed moment of inertia corresponding to the sum of a moment of inertia of the motor rotor itself and an equivalent moment of inertia. The equivalent moment of inertia is obtained by converting a moment of inertia produced owing to inertial masses of all electromagnetic-actuator component parts displacing and rotating within electromagnetic actuator 4 during the suspension stroke of electromagnetic actuator 4 into a moment of inertia of a hypothetical inertial mass being level with the motor-rotor position. L denotes a lead of ball-screw shaft 9, namely, a distance that ball-screw nut 10 axially advances or moves relative to ball-screw shaft 9 in one complete turn of the ball-screw shaft, whereas α denotes the reduction ratio of reduction gear 8a. Based on the previously-discussed assumption, that is, in presence of the displacement input, namely the stroke velocity "v" and stroke acceleration "a", the motor rotor is rotated at a motor angular acceleration dω/dt, which is represented by the following equation (1).

$$d\omega/dt = a \times (2\pi/L) \times \alpha \quad (1)$$

An inertia torque Ti occurring due to the motor angular acceleration dω/dt of the rotor of motor 8 is represented by the following equation (2).

$$Ti = J \cdot (d\omega/dt) = J \cdot \{a \times (2\pi/L) \times \alpha\} \quad (2)$$

Thus, the internal inertia force fi of electromagnetic actuator 4 is represented by the following equation (3).

$$fi = Ti \times (2\pi/L) \times \alpha = J \cdot \{a \times (2\pi/L) \times \alpha\} \times (2\pi/L) \times \alpha \quad (3)$$
$$= J \times \{(2\pi/L) \times \alpha\}^2 \times a = I \times a$$

where I (=J×{(2π/L)×α}$^2$) denotes an equivalent inertial mass, which is obtained by converting inertial masses of all electromagnetic-actuator component parts displacing and rotating within electromagnetic actuator 4 during the suspension stroke into a hypothetical inertial mass in the suspension stroke direction of electromagnetic actuator 4. Equivalent inertial mass I is determined as a fixed value based on the suspension shape and design specifications of electromagnetic actuator 4.

At step S4, a motor output fm is arithmetically calculated as the sum (f+fi) of electromagnetic actuator output f (see step S2) and internal inertia force fi of electromagnetic actuator 4, from the equation fm=(f+fi).

At step S5, a required motor current value Im corresponding to the motor output fm calculated through step S4, is calculated or retrieved from a predetermined Im-fm characteristic map (not shown).

At step S6, a control command signal corresponding to and indicative of required motor current value Im is output from motor controller 17 to motor driving circuit 15.

According to the motor control action of the electromagnetic suspension apparatus of the embodiment, when the displacement input (stroke velocity v and stroke acceleration a) is applied from the road to electromagnetic actuator 4, the electromagnetic-actuator internal inertia force fi (=I×a) exists within electromagnetic actuator 4. Therefore, even when there is no motor output (fm=0), the internal inertia force fi is produced within electromagnetic actuator 4 owing to input acceleration (stroke acceleration "a"). The magnitude of internal inertia force fi is in proportion to the input acceleration, in other words, stroke acceleration "a" (see the expression (3)). That is to say, there is no one-to-one correspondence between motor output fm and actuator output f determined based on motor angular velocity ω through step S2, because of the existing internal inertia force fi produced owing to input acceleration "a". Thus, when electromagnetic actuator 4 is used for the automotive active suspension system as shown in FIGS. 1-3 and motor 8 is controlled in accordance with the predetermined motor control rule (the predetermined damping characteristic map)

shown in FIG. 5, an internal inertia compensation for internal inertia force fi produced owing to equivalent inertial mass I must be taken into account. In the electromagnetic suspension apparatus of the embodiment, the internal inertia compensation for internal inertia force fi arising from equivalent inertial mass I is thus taken into account. That is, assuming that the actuator output is regarded as the sum (f+fi) of internal inertia force fi and actuator output f determined based on motor angular velocity ω through step S2, there is a substantially one-to-one correspondence between the motor output and the actuator output.

Figure 6:
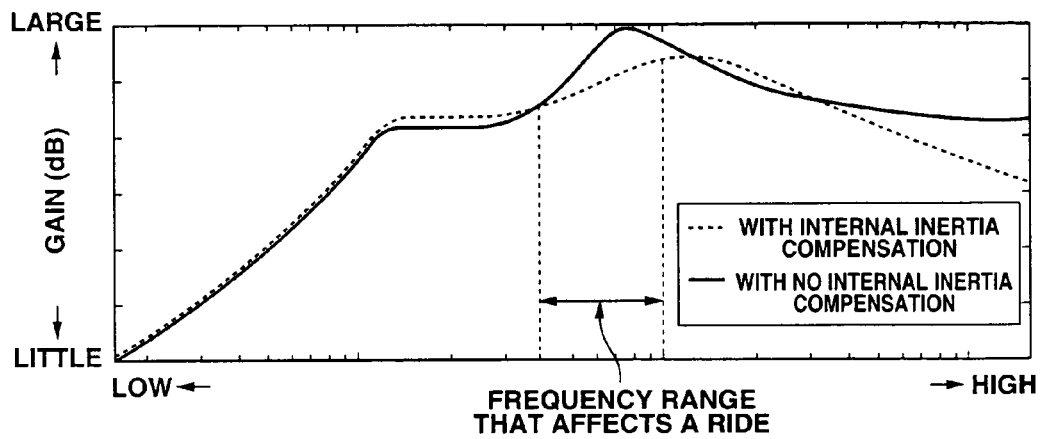
FIG. 6 is a comparison characteristic diagram showing the relationship between a frequency response characteristic of acceleration of a sprung mass for a displacement input from a road with internal inertia compensation and a frequency response characteristic of acceleration of the sprung mass for the displacement input from the road with no internal inertia compensation.

Referring now to FIG. 6, there are shown the comparison result between (i) a frequency response characteristic of acceleration of a sprung mass (the vehicle body) for a displacement input from a road to electromagnetic actuator 4 in the presence of the previously-discussed internal inertia compensation and (ii) a frequency response characteristic of acceleration of the same sprung mass for the same displacement input from the road to electromagnetic actuator 4 in the absence of the previously-discussed internal inertia compensation. In FIG. 6, the frequency response characteristic of acceleration of the sprung mass (the vehicle body), obtained with internal inertia compensation, is indicated by the phantom line, whereas the frequency response characteristic of acceleration of the sprung mass (the vehicle body), obtained with no internal inertia compensation, is indicated by the solid line. Note that a larger gain of the frequency response characteristic shown in FIG. 6 means a worse ride, whereas a smaller gain of the frequency response characteristic shown in FIG. 6 means a better ride. As can be appreciated from the comparison result between the two frequency response characteristics indicated by the solid line (the absence of internal inertia compensation) and the phantom line (the presence of internal inertia compensation), the peak value of the frequency response characteristic produced with internal inertia compensation (see the phantom line) is greatly reduced rather than that of the frequency response characteristic produced with no internal inertia compensation (see the solid line). In particular, in a specified frequency range that generally remarkably affects a ride, such as 4 Hz-10 Hz, all of the values of the frequency response characteristic produced with internal inertia compensation (see the phantom line) are kept at a relatively lower level over the specified frequency range from 4 Hz to 10 Hz, as compared to the respective values of the frequency response characteristic produced with no internal inertia compensation (see the solid line). From the comparison result previously discussed in reference to the two frequency response characteristics shown in FIG. 6, the electromagnetic suspension system of the embodiment executing the internal inertia compensation is superior to the suspension system not executing the internal inertia compensation, in better riding comfort.

Figure 7A:
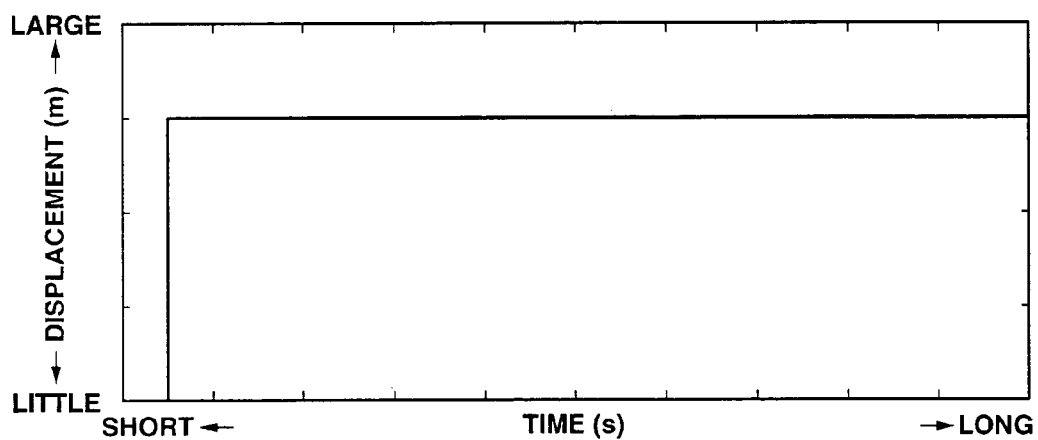
FIG. 7A shows a step input characteristic, that is, one example of a displacement input from a road to the vehicle.
Figure 7B:
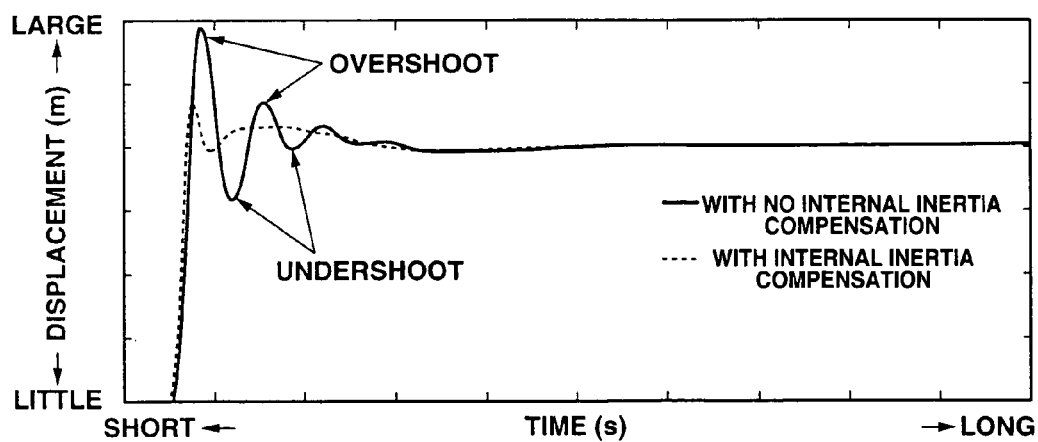
FIG. 7B is a frequency-response characteristic diagram showing the relationship between a frequency response of displacement of the sprung mass for the step input with internal inertia compensation and a frequency response of displacement of the sprung mass for the step input with no internal inertia compensation.

Referring now to FIGS. 7A and 7B, there are shown two different characteristics of response (see FIG. 7B) for displacement of the unsprung mass (the tire) with internal inertia compensation and with no internal inertia compensation, obtained under a condition where a step input (see FIG. 7A) is applied from the road to the quarter-car model (see FIG. 3) having two degrees of freedom. The step input from the road to the quarter-car mode can be regarded as a displacement input to the road to the vehicle suspension, when the vehicle gets over a sharply dropped or ridged road surface having a road level difference. In FIG. 7B, the response characteristic of displacement of the unsprung mass (the tire), obtained with internal inertia compensation, is indicated by the phantom line, whereas the response characteristic of displacement of the unsprung mass (the tire), obtained with no internal inertia compensation, is indicated by the solid line. As appreciated from the response of unsprung-mass displacement for the step input, indicated by the solid-line (with no internal inertia compensation) in FIG. 7B, undesirable remarkable overshoot and undershoot occur. Additionally, as seen from a comparatively long settling time in FIG. 7B, the convergence performance is bad. On the contrary, as appreciated from the response of unsprung-mass displacement for the step input, indicated by the phantom line (with internal inertia compensation) in FIG. 7B, undesirable overshoot and undershoot are effectively suppressed or reduced and thus a settling time is comparatively short and the convergence performance is comparatively high. That is, by way of the improved motor control executing the internal inertia compensation, it is possible to greatly enhance the road-surface follow-up performance of the unsprung mass (the tire), thus insuring a good grip of tire 6 on the road and enhancing the driving stability containing both the vehicle drivability and vehicle stability.

The automotive electromagnetic suspension apparatus of the embodiment secures the following effects.

(1) As set out above, the electromagnetic suspension apparatus of the embodiment includes electromagnetic actuator 4, interleaved between a sprung mass (vehicle body 1) and an unsprung mass (tire 6) and arranged in parallel with a suspension spring element (suspension spring 7) and driven by electric motor 8, and motor controller 17 (a motor control means) that calculates a displacement input transmitted from a road to electromagnetic actuator 4 and controls electric motor 8 to bring an actual suspension damping force closer to an optimal damping force (a desired damping force) suited for the displacement input. Motor controller 17 of the electromagnetic suspension apparatus of the embodiment includes an actuator internal inertia force calculation section (see step S3 of FIG. 4) through which internal inertia force fi of electromagnetic actuator 4 is arithmetically calculated, and also includes an actuator internal inertia force compensation section (see steps S4-S6 of FIG. 4) that achieves an internal inertia compensation for internal inertia force fi. Therefore, it is possible to provide a high-precision electromagnetic suspension apparatus, capable of greatly balancing two contradictory requirements, that is, a good riding comfort and a driving stability (vehicle drivability and vehicle stability).

(2) The actuator internal inertia force calculation section (step S3) arithmetically calculates a summed moment of inertia J of (i) a moment of inertia of the motor rotor itself of motor 8 and (ii) an equivalent moment of inertia, which is obtained by converting a moment of inertia produced owing to inertial masses of all electromagnetic-actuator component parts displacing and rotating within electromagnetic actuator 4 during the suspension stroke into a moment of inertia of a hypothetical inertial mass being level with the installation position of the motor rotor. The actuator internal inertia force calculation section (step S3) arithmetically calculates, based on the summed moment of inertia J, the internal inertia force fi of electromagnetic actuator 4. In this manner, according to the apparatus of the embodiment, all of the inertial masses existing in electromagnetic actuator 4 and the mass moment of inertia of each of these inertial masses displacing and rotating within electromagnetic actuator 4 during the suspension stroke are taken into account. Thus, it is possible to more precisely compute or estimate internal inertia force fi of electromagnetic actuator 4.

(3) Motor controller 17 incorporated in the electromagnetic suspension apparatus of the embodiment is designed to calculate motor output fm as a summed force or a resultant force (f+fi) of (i) electromagnetic actuator output f, which is determined in accordance with a predetermined control rule (a predetermined damping characteristic or a predetermined ω-f characteristic map) preprogrammed to ensure or provide an optimal damping force (a desired damping force), and (ii) internal inertia force fi of electromagnetic actuator 4, is determined as motor output fm (=f+fi). A command signal value required to produce the motor output fm (=f+fi) is generated from motor controller 17 to motor driving circuit 15. In other words, the internal inertia force compensation processing, which is represented by the equation fm=f+fi, is simply combined with or added to the basic arithmetic-calculation processing needed to compute actuator output f based on the predetermined control rule (the predetermined damping characteristic map as shown in FIG. 5). The combined arithmetic operations are very simple and have higher degrees of freedom or a higher flexibility of motor control. Thus, the electromagnetic suspension apparatus of the embodiment realizes a more precise motor control of electromagnetic actuator 4, taking account of the internal inertia compensation for internal inertia force fi of electromagnetic actuator 4.

(4) Furthermore, as discussed above, a driving state of motor 8, exactly a driving current value (required current value Im) of motor 8, is controlled, while compensating for internal inertia force fi of electromagnetic actuator 4. Therefore, it is possible to provide a more accurate motor control method for electromagnetic actuator 4 of the electromagnetic suspension apparatus, capable of greatly balancing two contradictory requirements, that is, a good riding comfort and a driving stability (vehicle drivability and vehicle stability).

As set forth above, the electromagnetic suspension apparatus of the embodiment is exemplified in a four-wheeled automotive vehicle employing multi-link independent suspensions at each road wheel. In lieu thereof, the electromagnetic suspension apparatus of the embodiment may be applied to an automotive vehicle employing the other types of suspensions, for example, MacPherson strut suspensions.

Furthermore, in the apparatus of the embodiment, actuator output f is calculated or map-retrieved based on motor angular velocity ω from the predetermined motor angular velocity ω versus electromagnetic actuator output f characteristic map (the predetermined control rule or the predetermined damping characteristic map) shown in FIG. 5. Actually, in the shown embodiment, as appreciated from the ω-f characteristic map of FIG. 5, the predetermined linear damping characteristic (see the straight characteristic line shown in FIG. 5) is used as the predetermined control rule. Instead of using such a linear ω-f damping characteristic, actuator output f may be calculated or map-retrieved based on motor angular velocity ω from a non-linear ω-f damping characteristic curve showing how actuator output f has to be varied relative to motor angular velocity ω in a non-linear fashion. Alternatively, instead of using motor angular velocity ω as a factor needed to derive actuator output f, stroke velocity v (=ds/dt) may be used. In this case, actuator output f can be calculated or map-retrieved based on stroke velocity v from a predetermined linear v-f damping characteristic curve showing how actuator output f has to be varied relative to stroke velocity v in a linear fashion, or actuator output f can be calculated or map-retrieved based on stroke velocity v from a predetermined non-linear v-f damping characteristic curve showing how actuator output f has to be varied relative to stroke velocity v in a non-linear fashion.

Moreover, in the shown embodiment, although only the internal inertia force compensation for internal inertia force fi of electromagnetic actuator 4 is adequately taken into account, an external inertia compensation for an external inertia force fe exerted on the vehicle owing to a reaction torque based on a motor rotation angle θ, a dampening torque based on a motor angular velocity ω (=dθ/dt), and a vehicle-body-inertia compensating torque based on a motor angular acceleration dω/dt (=d²θ/dt²) may be additionally taken into account. In this case, actuator output f can be calculated or retrieved based on a summed torque of the reaction torque based on motor rotation angle θ, the dampening torque based on motor angular velocity ω (=dθ/dt), and the vehicle-body-inertia compensating torque based on motor angular acceleration dω/dt (=d²θ/dt²), from a preprogrammed summed-torque versus actuator output f characteristic map. Thereafter, the motor output fm is calculated as a sum of internal inertia force fi and the actuator output f determined based on the summed torque of the reaction torque based on motor rotation angle θ, the dampening torque based on motor angular velocity ω, and the vehicle-body-inertia compensating torque based on motor angular acceleration dω/dt. In this manner, in case that the internal inertia compensation (fi) and the external inertia compensation (fe) are both taken into account, it is possible to perform a more precise motor control of electromagnetic actuator 4, thereby more greatly balancing two contradictory requirements, that is, a good riding comfort and a driving stability (vehicle drivability and vehicle stability).

The entire contents of Japanese Patent Application No. 2003-027858 (filed Feb. 5, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A method of controlling an electric motor of an electromagnetic suspension apparatus for an automotive vehicle employing a motor-driven electromagnetic actuator interleaved between a sprung mass and an unsprung mass and arranged in parallel with a suspension spring element, and a motor controller that calculates a displacement input transmitted to the electromagnetic actuator and controls the motor to bring a suspension damping force closer to a desired damping force suited for the displacement input, the method comprising:

controlling a driving state of the motor, while compensating for an internal inertia force of the electromagnetic actuator, wherein a driving current value of the motor is controlled based on the internal inertia force and an external inertia force exerted on the vehicle owing to a reaction torque based on a motor rotation angle of a motor rotor of the motor, a dampening torque based on a motor angular velocity of the motor rotor of the motor, and a vehicle-body-inertia compensating torque based on a motor angular acceleration of the motor rotor, to control the driving state of the motor, while compensating for the internal inertia force of the electromagnetic actuator.

2. The method as claimed in claim 1, further comprising:
estimating a suspension stroke acceleration of the electromagnetic actuator and the motor angular velocity of the motor rotor of the motor as quantities of state of the vehicle;
estimating an electromagnetic actuator output of the electromagnetic actuator based on the motor angular velocity in accordance with a predetermined control rule that provides the desired damping force;
calculating the internal inertia force of the electromagnetic actuator based on the suspension stroke acceleration of the electromagnetic actuator;
calculating a motor output as a summed force of the electromagnetic actuator output and the internal inertia force of the electromagnetic actuator; and
outputting a control command signal required to produce the motor output from the motor controller to a motor driving circuit for the motor.

3. The method as claimed in claim 2, wherein:
the motor comprises a geared motor having a predetermined reduction ratio and the electromagnetic actuator comprises a ball-screw mechanism with a ball-screw shaft and a ball-screw nut threadably engaged with each other via recirculating balls to permit rotary motion of the ball-screw shaft to be converted into linear motion of the ball-screw nut and also to permit linear motion of the ball-screw nut to be converted into rotary motion of the ball-screw shaft; and
the step of calculating the internal inertia force of the electromagnetic actuator comprises:
(i) calculating the angular acceleration $d\omega/dt$ of the motor rotor of the motor based on the suspension stroke acceleration of the electromagnetic actuator, from an equation $d\omega/dt = a \times (2\pi/L) \times \alpha$, where a is the suspension stroke acceleration of the electromagnetic actuator, L is a lead of the ball-screw shaft that the ball-screw nut axially moves relative to the ball-screw shaft in one complete turn of the ball-screw shaft, and $\alpha$ is the predetermined reduction ratio of the motor;
(ii) calculating, based on the calculated angular acceleration $d\omega/dt$, an inertia torque $T_i$ of the motor rotor occurring due to the angular acceleration of the motor rotor, from an equation $T_i = J \cdot (d\omega/dt) = J \cdot \{a \times (2\pi/L) \times \alpha\}$, where J is a summed moment of inertia corresponding to a sum of a moment of inertia of the motor rotor itself and an equivalent moment of inertia obtained by converting a moment of inertia produced owing to inertial masses of all electromagnetic-actuator component parts displacing and rotating within the electromagnetic actuator during a suspension stroke of the electromagnetic actuator into a moment of inertia of a hypothetical inertial mass being level with a position of the motor rotor; and
(iii) calculating, based on the calculated angular acceleration $d\omega/dt$, the internal inertia force fi of the electromagnetic actuator, from an equation $f_i = T_i \times (2\pi/L) \times \alpha = J \times \{(2\pi/L) \times \alpha\}^2 \times a$.

4. The method as claimed in claim 2, wherein:
the step of estimating the suspension stroke acceleration and the motor angular velocity comprises:
directly detecting the suspension stroke acceleration of the electromagnetic actuator and the motor angular velocity.

5. The method as claimed in claim 2, wherein:
the step of estimating the suspension stroke acceleration and the motor angular velocity comprises:
detecting a suspension stroke of the electromagnetic actuator by a level sensor; detecting the motor rotation angle of the motor rotor of the motor;
calculating the suspension stroke acceleration by second-order differential of the suspension stroke; and
calculating the motor angular velocity by first-order differential of the motor rotation angle.

6. A method of controlling an electric motor of an electromagnetic suspension apparatus for an automotive vehicle employing a motor-driven electromagnetic actuator interleaved between a sprung mass and an unsprung mass and arranged in parallel with a suspension spring element, and a motor controller that calculates a displacement input transmitted to the electromagnetic actuator and controls the motor to bring a suspension damping force closer to a desired damping force suited for the displacement input, the method comprising:
controlling a driving state of the motor, while compensating for an internal inertia force of the electromagnetic actuator;
estimating a suspension stroke acceleration of the electromagnetic actuator and a motor angular velocity of a motor rotor of the motor as quantities of state of the vehicle;
estimating an electromagnetic actuator output of the electromagnetic actuator based on the motor angular velocity in accordance with a predetermined control rule that provides the desired damping force;
calculating the internal inertia force of the electromagnetic actuator based on the suspension stroke acceleration of the electromagnetic actuator;
calculating a motor output as a summed force of the electromagnetic actuator output and the internal inertia force of the electromagnetic actuator; and
outputting a control command signal required to produce the motor output from the motor controller to a motor driving circuit for the motor.

7. The method as claimed in claim 6, wherein:
a driving current value of the motor is controlled based on the control command.

* * * * *